United States Patent
Kuang et al.

(10) Patent No.: US 8,013,907 B2
(45) Date of Patent: Sep. 6, 2011

(54) SYSTEM AND METHOD FOR ADAPTIVE LOCAL WHITE BALANCE ADJUSTMENT

(75) Inventors: Jiangtao Kuang, Sunnyvale, CA (US); Weihua Xiong, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 585 days.

(21) Appl. No.: 12/099,351

(22) Filed: Apr. 8, 2008

(65) Prior Publication Data

US 2009/0251561 A1    Oct. 8, 2009

(51) Int. Cl.
*H04N 9/73* (2006.01)
(52) U.S. Cl. .................................... 348/223.1
(58) Field of Classification Search ............... 348/223.1, 348/655, E9.051; 382/167
See application file for complete search history.

(56) References Cited

U.S. PATENT DOCUMENTS

| | | | |
|---|---|---|---|
| 7,130,463 B1 * | 10/2006 | Spangler | 382/168 |
| 7,483,058 B1 * | 1/2009 | Frank et al. | 348/222.1 |
| 2004/0085458 A1 | 5/2004 | Yanof et al. | |
| 2006/0153444 A1 * | 7/2006 | Trimeche et al. | 382/167 |
| 2007/0133071 A1 | 6/2007 | Noyes et al. | |
| 2007/0133868 A1 | 6/2007 | Hu | |

OTHER PUBLICATIONS

Rastislav Lukac; "New Framework for Automatic White Balancing of Digital Camera Images," Signal Processing, vol. 88, No. 3, Mar. 2008, pp. 582-593.

PCT International Search Report and Written Opinion, International Application No. PCT/US2009/036857, mail date Jun. 19, 2009.
Hirakawa, K., et al.; "Chromatic Adaptation and White-Balance Problem," IEEE International Conference on Image Processing, Sep. 2005, 4 pages.
HP Photosmart Digital Cameras, Real Life Technologies, "HP Adaptive White Balance," 2005, Hewlett-Packard Development Company, LP., 2 pages.

* cited by examiner

*Primary Examiner* — David Ometz
*Assistant Examiner* — Akshay Trehan
(74) *Attorney, Agent, or Firm* — Blakely Sokoloff Taylor & Zafman LLP

(57) ABSTRACT

The disclosure describes embodiments of an apparatus comprising an image sensor including a pixel array having a plurality of pixels and an automatic white balance (AWB) circuit coupled to the pixel array. The AWB circuit is used to determine a local white balance component for each pixel, determine a global white balance component for each pixel, and apply a white balance adjustment to each pixel, the applied white balance adjustment comprising a combination of the local white balance component and the global white balance component. The disclosure also describes embodiment of a process including receiving image data from each pixel in a pixel array, determining a local white balance component for the image data from each pixel, determining a global white balance component for the image data from each pixel, and applying a white balance adjustment to the image data from each pixel, the applied white balance adjustment comprising a combination of the local white balance component and the global white balance component. Other embodiments are also disclosed and claimed.

46 Claims, 3 Drawing Sheets

SYSTEM AND METHOD FOR ADAPTIVE LOCAL WHITE BALANCE ADJUSTMENT

TECHNICAL FIELD

The present invention relates generally to image sensors and in particular, but not exclusively, to an apparatus, system and method for adaptive local white balance adjustment in an image sensor.

BACKGROUND

The color of a scene in an image appears different depending on what kind of light source (i.e., what kind of illuminant) was incident on the scene when the image was taken. This is because different illuminants such as incandescent light, fluorescent light, and daylight, have different power spectral distributions. White balance (WB) is the process of removing unrealistic color casts so that objects that appear white in a scene also appear white in an image of that scene. In CMOS image sensors, this problem is solved by adjusting the gains of the three primary color channels: red, green and blue. The capability to do white balancing automatically without user interference is known as automatic white balance (AWB).

The most widely used AWB process is based on the "gray-world" assumption; this assumption states that the average of the color in a scene is gray or colorless. Another commonly used assumption is the "white-world" assumption, which states that the brightest point in a scene is white, meaning that the red, green and blue values at the brightest point in a scene are equal to each other.

Although these assumptions are often true in many situations, they fail to provide proper white balance in images taken of a scene illuminated by multiple illuminants. For example, images having a wide shadow in an outdoor scene illuminated by sunshine fall into this category. When common AWB method are applied to these scenes, either only one part of an image is white balanced, leaving other parts having incorrect color casts, or neither parts is properly corrected as the AWB methods try to find a trade-off between different illuminants.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for adaptive local white balance adjustment are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
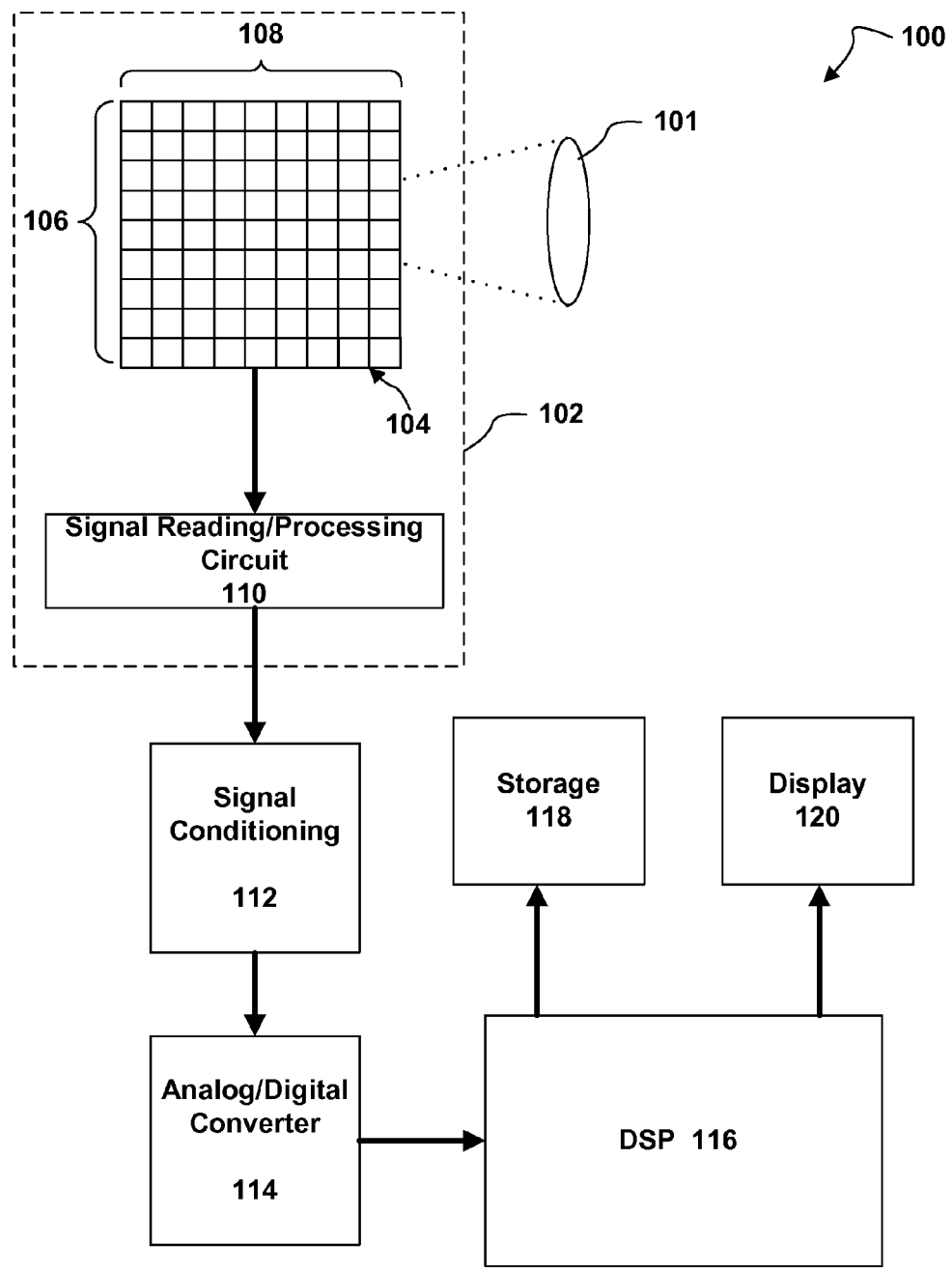
FIG. 1 is a schematic diagram of an embodiment of an imaging system including an image sensor.

FIG. 1 illustrates an embodiment of an imaging system 100. Optics 101, which can include refractive, diffractive or reflective optics or combinations of these, are coupled to image sensor 102 to focus an image onto the pixels in pixel array 104 of the image sensor. Pixel array 104 captures the image and the remainder of apparatus 100 processes the pixel data from the image.

Image sensor 102 comprises a pixel array 104 and a signal reading and processing circuit 110. Pixel array 104 is two-dimensional and includes a plurality of pixels arranged in rows 106 and columns 108. During operation of pixel array 104 to capture an image, each pixel in pixel array 104 captures incident light (i.e., photons) during a certain exposure period and converts the collected photons into an electrical charge. The electrical charge generated by each pixel can be read out as an analog signal, and a characteristic of the analog signal such as its charge, voltage or current will be representative of the intensity of light that was incident on the pixel during the exposure period.

Illustrated pixel array 104 is regularly shaped, but in other embodiments the array can have a regular or irregular arrangement different than shown and can include more or less pixels, rows, and columns than shown. Moreover, in different embodiments pixel array 104 can be a color image sensor including red, green, and blue pixels designed to capture images in the visible portion of the spectrum, or can be a black-and-white image sensor and/or an image sensor designed to capture images in the invisible portion of the spectrum, such as infra-red or ultraviolet.

Image sensor 102 includes signal reading and processing circuit 110. Among other things, circuit 110 can include circuitry and logic that methodically read analog signals from each pixel and filter these signals, correct for defective pixels, and so forth. In some embodiments, circuit 110 can also perform some or all of the automatic white balance process described below. In an embodiment where circuit 110 performs only part of the automatic white balance process, the remainder of the process can be performed by one or more other components such as signal conditioner 112 or DSP 116. Although shown in the drawing as an element separate from pixel array 104, in some embodiments reading and processing circuit 110 can be integrated with pixel array 104 on the same substrate or can comprise circuitry and logic embedded within the pixel array. In other embodiments, however, reading and processing circuit 110 can be an element external to pixel array 104 as shown in the drawing. In still other embodiments, reading and processing circuit 110 can be an element not only external to pixel array 104, but also external to image sensor 102.

Signal conditioner 112 is coupled to image sensor 102 to receive and condition analog signals from pixel array 104 and reading and processing circuit 110. In different embodiments, signal conditioner 112 can include various components for conditioning analog signals. Examples of components that can be found in signal conditioner include filters, amplifiers, offset circuits, automatic gain control, etc. In some embodiments, signal conditioner 112 can also perform some or all of the automatic white balance process described below. In an embodiment where signal conditioner 112 performs only part of the automatic white balance process, the remainder of the process can be performed by one or more other components such as circuit 110 or DSP 116. Analog-to-digital converter (ADC) 114 is coupled to signal conditioner 112 to receive conditioned analog signals corresponding to each pixel in pixel array 104 from signal conditioner 112 and convert these analog signals into digital values.

Digital signal processor (DSP) 116 is coupled to analog-to-digital converter 114 to receive digitized pixel data from ADC 114 and process the digital data to produce a final digital image. DSP 116 can include a processor and an internal memory in which it can store and retrieve data. In some embodiments, DSP 116 can perform some or all of the automatic white balance process described below. In an embodiment where DSP 116 performs only part of the automatic white balance process, the remainder of the process can be performed by one or more other components such as circuit 110 or signal conditioner 112. After the image is processed by DSP 116, it can be output to one or both of a storage unit 118 such as a flash memory or an optical or magnetic storage unit and a display unit such as an LCD screen.

Figure 2:
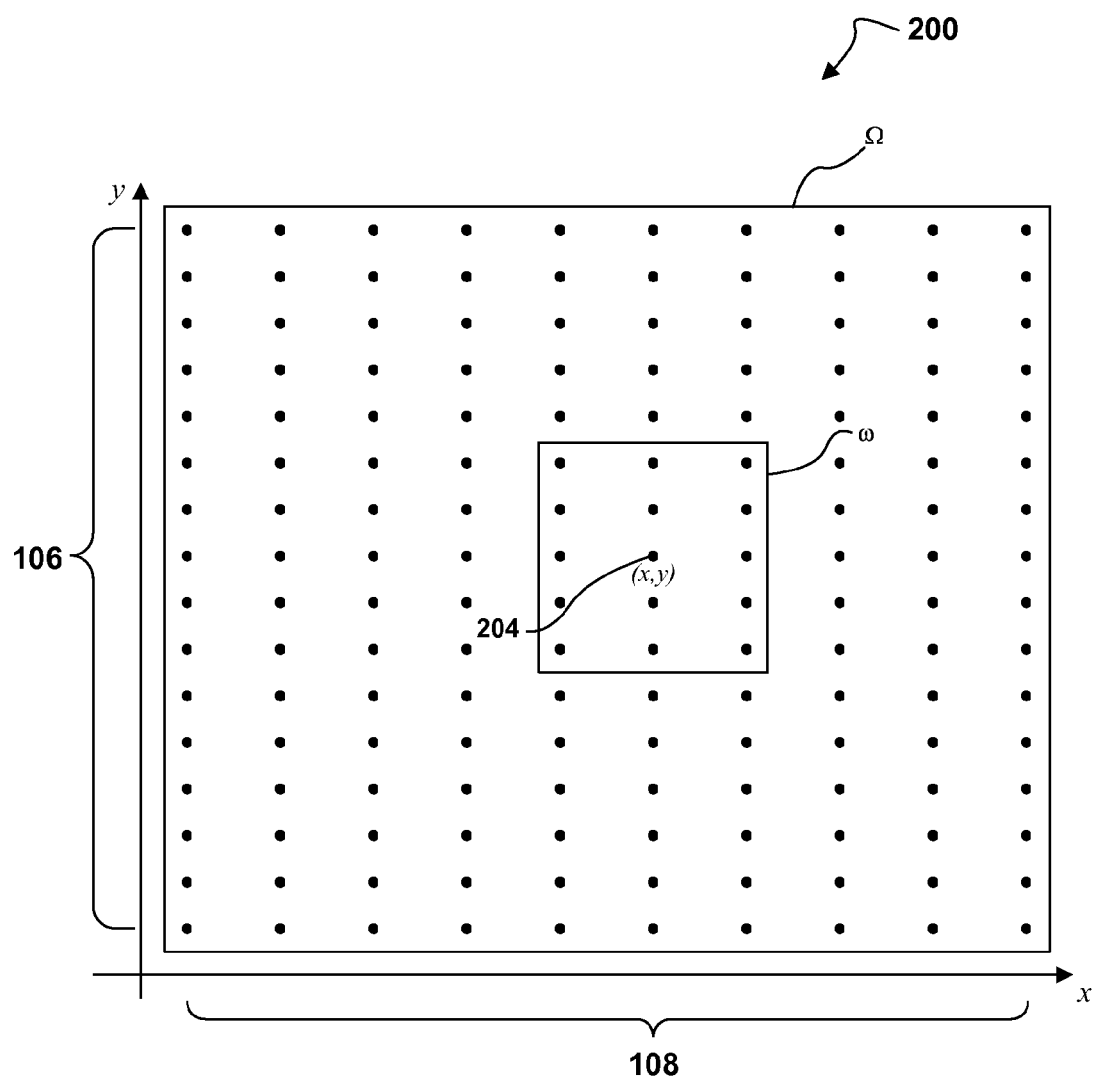
FIG. 2 is a diagram of an embodiment of a pixel array illustrating embodiments of local and global domains used for an embodiment of automatic white balance adjustment.

FIG. 2 illustrates an embodiment of a pixel array 200 and will be used to explain an embodiment of a process for automatic white balance. Each dot in FIG. 2 represents an individual pixel from a pixel array such as pixel array 104 shown in FIG. 1. Each individual pixel in array 200 can be identified by its coordinates in the array; in the illustrated embodiment, pixel 204 is identified by a coordinate pair (x, y) that denotes the physical x and y coordinates of the pixel in the array, and other pixels in array 200 can be similarly identified. In other embodiments, however, other ways can be used to identify individual pixels, such as row/column coordinates or individual pixel addresses.

When pixel array 200 captures a color image, each individual pixel typically captures only one color, depending on the type of color filter used with that pixel. In an embodiment in which pixel array 200 is a Red-Green-Blue (RGB) pixel array, some pixels can be "red pixels" that include a red filter and capture only red, some pixels can be "green pixels" that include a green filter and capture only green, and some pixels can be "blue pixels" that include a blue filter and capture only blue. These red, green, and blue pixels can be laid out in pixel array 200 in various patterns, such as the well-known Bayer pattern. In some embodiments pixel array 200 can also include "white pixels" that have no color filter.

Despite capturing only one color, each pixel (x, y) in pixel array 200 will output a Red value R(x, y), a green value G(x, y), and a blue value B(x, y). This is because, for a particular pixel, the values for the colors not originally captured by that pixel are interpolated from neighboring pixels. For example, a pixel (x, y) that is a red pixel will only capture a red value R(x, y) from the image, but will nonetheless have a green value G(x, y) interpolated from neighboring green pixels and a blue value B(x, y) interpolated from neighboring blue pixels. Thus, after the image capture and some initial processing, every pixel (x, y) in pixel array 200 ends up with a set of red, green, and blue values. This set of RGB data can then be output from pixel array 200 for further processing, including automatic white balance (AWB) processing as further described below.

The embodiment of an automatic white balance process is based on a widely accepted assumption in human vision that an image is regarded as a product of the reflectance of the object in the scene and the illuminance of the light source:

$$I(x,y) = R(x,y)L(x,y), \qquad \text{Eq. (1)}$$

where $R(x, y)$ is the reflectance and $L(x, y)$ is the illuminance at each point (x,y). A common assumption for simplicity in calculating R and L is that L varies smoothly while R can change abruptly. A low-pass filtering of the image is regarded as the illuminance of the scene, and this illuminance computed from the scene is used for the automatic white balance adjustment.

In an embodiment of the automatic white balance process, the illuminance L of the scene is computed using an anisotropic filtering that uses the above assumption to extract L by low-pass filtering the image. The details of this filtering are shown below. White-balance-adjusted red values R', green values G', and blue values B' are then calculated for each pixel (x, y) by multiplying each original R, G, or B value by a corresponding weight k for that pixel, as shown in equation (2):

$$R'(x,y) = k_R(x,y)R(x,y)$$
$$G'(x,y) = k_G(x,y)G(x,y) \qquad \text{Eq. (2)}$$
$$B'(x,y) = k_B(x,y)B(x,y)$$

where the red weight $k_R$, the green weight $k_G$ and the blue weight $k_B$ are calculated using equation (3):

$$k_R = \max(R_w(x,y)G_w(x,y)B_w(x,y))/R_w(x,y)$$
$$k_G = \max(R_w(x,y)G_w(x,y)B_w(x,y))/G_w(x,y) \qquad \text{Eq. (3)}$$
$$k_B = \max(R_w(x,y)G_w(x,y)B_w(x,y))/B_w(x,y)$$

In equation (3), adjustments $R_w$, $G_w$ and $B_w$ are determined for each pixel (x, y) using a combination of local and global components. Using both local and global components creates an adaptive anisotropic bilateral filtering that is edge-preserving and chromaticity-preserving. Determination of $R_w$, $G_w$, and $B_w$ and the local and global components of each is further described below.

As its name implies, the local component of $R_w$, $G_w$, or $B_w$ for a particular pixel is computed based upon local pixels—that is, the particular pixel and other pixels in the vicinity of the particular pixel. As shown in FIG. 2, a local domain ω containing a subset of the pixels in the array is selected to surround the pixel whose values of $R_w$, $G_w$ and $B_w$ are being determined. In the illustrated embodiment, pixel 204 has coordinates (x, y) and the local domain ω is defined by a rectangular box surrounding pixel 204. All the pixels encompassed within local domain ω make up the set of pixel data that can be used to calculate the local component. In other embodiments, local domain ω can be larger or smaller, can have a different shape than shown, and need not be centered on the pixel for which the local component is being calculated.

Once the local domain ω is established, the illuminance—that is, the local components of $R_w$, $G_w$ and $B_w$—can be calculated. In one embodiment, equations 4 and 5, which use the color red as an example, are used to calculate the local component for a particular pixel s within the local domain:

$$R_{local} = \frac{1}{k(s)} \sum_{p \in \omega} f(p-s)g(I_p - I_s)R_s \qquad \text{Eq. (4)}$$

-continued $$k(s) = \sum_{p \in \omega} f(p-s)g(I_p - I_s) \quad \text{Eq. (5)}$$

where $R_{local}$ is the local component of the red adjustment $R_w$, $f$ is a spatial domain Gaussian filtering function, g is an intensity domain Gaussian filtering function, p refers to distance between the particular pixel s and other pixels in the local domain, and $I_p$ refers to the intensity values of other pixels in the domain. The Gaussian function $f$ in the spatial domain decreases the weight of pixels that are spatially distant from the particular pixel s, while the Gaussian function g in the intensity domain decreases the weight of pixels whose intensity differs greatly from the intensity of the particular pixel s. Therefore, the output value of the local component for the particular pixel s is mainly influenced by the pixels that are spatially close and that have similar intensity. For each particular pixel s, the calculations of equations (4) and (5) are repeated with the green values to obtain a value of $G_{local}$ and with blue values to obtain a value of $B_{local}$.

Once the local components of $R_w$, $G_w$, and $B_w$ are determined as shown above, the global component of these quantities can be determined. Using only local white balance adjustment tends to decrease the saturation of colorful objects. Using a combination of local and global components for $R_w$, $G_w$, and $B_w$ results in a chromaticity preserving technique that prevents decreased saturation.

The global AWB adjustment can be any AWB process that determines a global set of red, green and blue adjustments using a global domain $\Omega$ that is typically different than the local domain $\omega$. In one embodiment the global domain $\Omega$ comprises the whole image—that is every pixel in pixel array 200. In other embodiments, however, global domain $\Omega$ can comprise less than all pixels in the image.

Using the set of pixels in global domain $\Omega$, a set of red, green and blue global components $R_{global}$, $G_{global}$, and $B_{global}$ can be determined. For example, the well-known "gray-world" technique is an example of a global process that can be used to determine these quantities. The chromaticity is calculated from the global results using equation (6) to exclude the color cast if possible.

$$r = \frac{G_{global}}{R_{global}} \quad \text{Eq. (6)}$$

$$b = \frac{G_{global}}{B_{global}}$$

For each color, the final white balance results (i.e., the final values of $R_w$, $G_w$ and $B_w$) are a linear combination of the global component results and local component, as shown in equations (7) and (8). The weight m applied to the local component depends on the square root value of the chromaticity values, which decreases the weight for large chromaticity objects.

$$R_w = mR_{local} + (1-m)R_{global} \quad \text{Eq. (7)}$$

$$m = l(\sqrt{r^2 + b^2}) \quad \text{Eq. (8)}$$

where $l(\sqrt{r^2+b^2})$ is a monotonically decreasing function of $(\sqrt{r^2+b^2})$. For each particular pixel s, the calculations of equations 7 and 8 are repeated with the green values to obtain a value of $G_w$ and with blue values to obtain a value of $B_w$.

After final values of adjustments $R_w$, $G_w$, and $B_w$ are determined, these can then be used as shown in equations (2) and (3) to apply a white balance adjustment to the raw pixel data. The white balance adjustment can be applied differently depending on what part of an imaging system performs the balancing. In an embodiment of system 100 where the white balance is performed by circuit 110 (see FIG. 1), the pixel data will be analog and the white balance adjustment can be applied by adjusting the gains of the red, green and blue channels. In another embodiment where the white balance is performed in DSP 116, the pixel data will be digital and the white balance adjustment can be applied by adjusting the digital red, green and blue values for each pixel.

Figure 3:
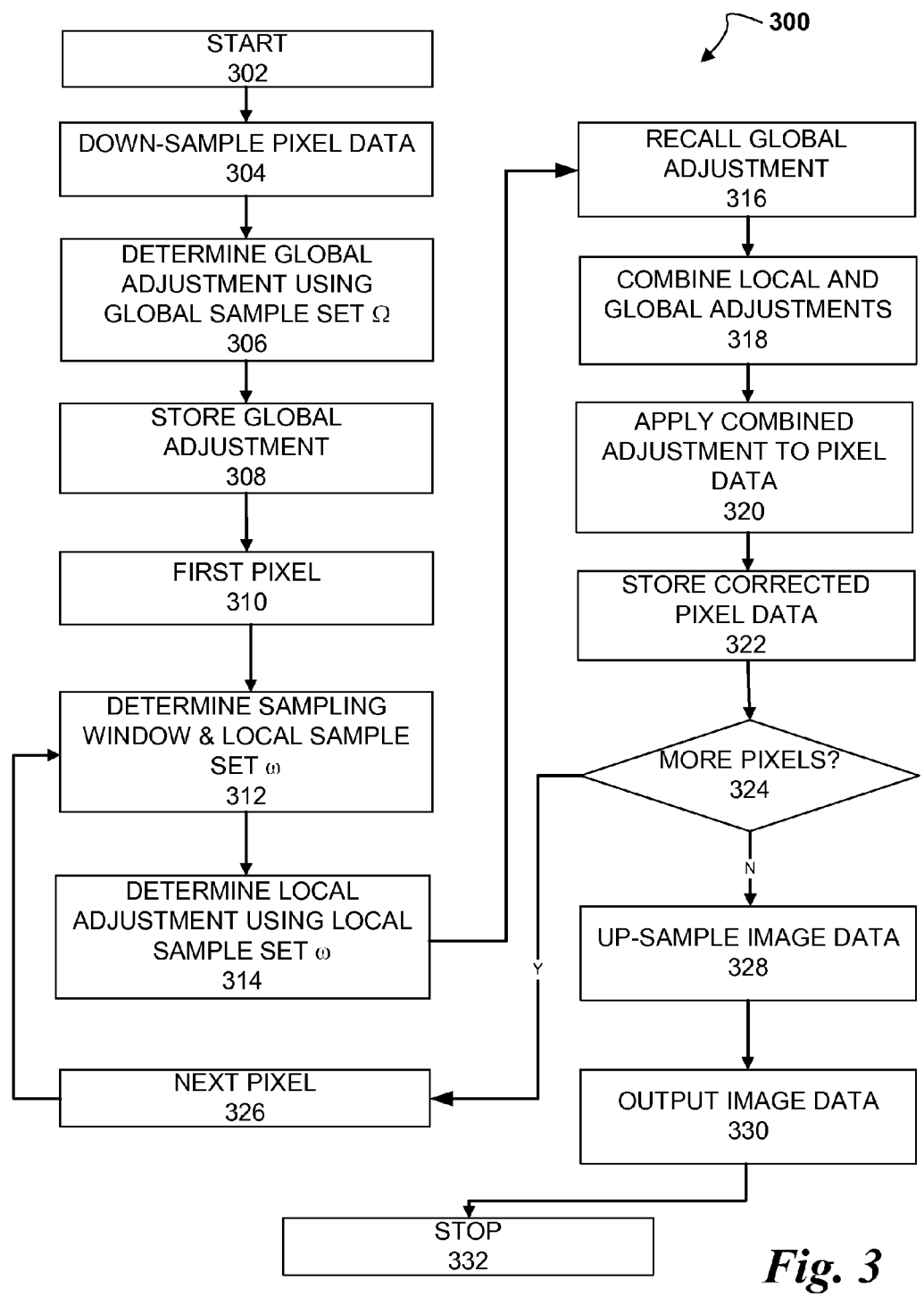
FIG. 3 is a flowchart illustrating an embodiment of a process for automatic white balance adjustment.

FIG. 3 is a flowchart illustrating an embodiment of a process 300 for automatic white balance in an embodiment of an image-capture system such as system 100. The process starts at block 302. At block 304, which has a dashed outline to indicate that this block is optional, pixel data received from the pixel array in an image sensor is first down-sampled, meaning that the amount of data in the image is reduced so that the image can be processed faster. Down-sampling can be performed when needed for greater computational efficiency and/or preservation of system resources such as memory and communication bandwidth.

At block 306, process 300 determines the global white balance adjustments $R_{global}$, $G_{global}$, and $B_{global}$ in the selected global domain $\Omega$ as described above in connection with FIG. 2. After determining the global white balance adjustments, at block 308 these global components of $R_w$, $G_w$, and $B_w$ are stored for later combination with local white balance adjustments.

At block 310, the process selects the first pixel for which a local white balance adjustment will be determined, and at block 312 the process identifies the local domain $\omega$ that will be used to determine the local white balance adjustments for that particular pixel. Once the process identifies local domain $\omega$, at block 314 the process uses the set of pixels within local domain $\omega$ to determine the value of the local component of $R_w$, $G_w$, and $B_w$ for the pixel as described above.

Having determined the local white balance adjustment at block 314, at block 316 the process recalls the global white balance adjustment values and at block 318 the process combines both the local white balance adjustment and the global white balance adjustment as described above to produce a single white balance adjustment that will be applied to the original pixel data to adjust its white balance At block 320 the single white balance adjustment is applied to the pixel and at block 322 the white-balance-adjusted pixel data is stored as part of the white-balance-adjusted image that will eventually be output by process 300.

At block 324 the process checks whether there are more pixels from the pixel array whose white balance adjustments need to be computed. If there are more pixels to be corrected, the process selects the next pixel at block 326 and returns to block 312 and goes through block 312 to 322 again for the next pixel. If at block 324 there are no more pixels for which to determine white balance adjustments, the data from all pixels in the array has had its white balance adjusted and the final white-balance-adjusted image is ready to go. The process them moves to block 328 where, if the optional down-sampling was performed at block 304 the data can optionally be up-sampled to reverse the effects of the down-sampling. The final white-balance-adjusted image data is then output, for example to a display or storage unit as shown in FIG. 1, at block 330 and the process stops at block 332.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   an image sensor including a pixel array having a plurality of pixels;
   an automatic white balance (AWB) circuit coupled to the pixel array to:
      determine a local white balance component for each pixel using a spatial-domain function and an intensity-domain function, wherein the spatial-domain function decreases the weight of pixels within a local domain that are spatially distant from the pixel to which the white balance adjustment is being applied,
      determine a global white balance component for each pixel, and
      apply a white balance adjustment to each pixel, the applied white balance adjustment comprising a combination of the local white balance component and the global white balance component.

2. The apparatus of claim 1 wherein the AWB circuit determines local white balance components for each red, green, and blue value output by each pixel.

3. The apparatus of claim 1 wherein the AWB circuit determines the local white balance component for a particular pixel using data from other pixels within a local domain surrounding the particular pixel.

4. The apparatus of claim 1 wherein the AWB circuit determines the global white balance component for a particular pixel using image data from pixels in a global domain, the global domain being different than the local domain.

5. The apparatus of claim 4 wherein the global domain comprises all active pixels in the pixel array.

6. The apparatus of claim 1 wherein the spatial-domain function is a Gaussian kernel function.

7. The apparatus of claim 1 wherein the combination of the local white balance component and the global white balance component is a linear combination.

8. An apparatus comprising:
   an image sensor including a pixel array having a plurality of pixels;
   an automatic white balance (AWB) circuit coupled to the pixel array to:
      determine a local white balance component for each pixel using a spatial-domain function and an intensity-domain function, wherein the intensity-domain function decreases the weight of pixels within a local domain whose intensity differs greatly from the intensity of the pixel to which the white balance adjustment is being applied,
      determine a global white balance component for each pixel, and
      apply a white balance adjustment to each pixel, the applied white balance adjustment comprising a combination of the local white balance component and the global white balance component.

9. The apparatus of claim 8 wherein the AWB circuit determines local white balance components for each red, green, and blue value output by each pixel.

10. The apparatus of claim 8 wherein the AWB circuit determines the local white balance component for a particular pixel using data from other pixels within a local domain surrounding the particular pixel.

11. The apparatus of claim 8 wherein the AWB circuit determines the global white balance component for a particular pixel using image data from pixels in a global domain, the global domain being different than the local domain.

12. The apparatus of claim 11 wherein the global domain comprises all active pixels in the pixel array.

13. The apparatus of claim 8 wherein the intensity-domain function is a Gaussian kernel function.

14. The apparatus of claim 8 wherein the combination of the local white balance component and the global white balance component is a linear combination.

15. A system comprising:
   an optical element;
   an image sensor coupled to the optical element, the image sensor comprising a pixel array including a plurality of pixels;
   an automatic white balance (AWB) circuit coupled to the pixel array to:
      determine a local white balance component for each pixel using a spatial-domain function and an intensity-domain function, wherein the spatial-domain function decreases the weight of pixels within a local domain that are spatially distant from the pixel to which the white balance adjustment is being applied,
      determine a global white balance component for each pixel, and
      apply a white balance adjustment to each pixel, the applied white balance adjustment comprising a combination of the local white balance component and the global white balance component; and
   one or both of a display unit and a storage unit coupled to the digital signal processor.

16. The system of claim 15 wherein the AWB circuit is a circuit within the image sensor.

17. The system of claim 15 wherein the AWB circuit is a digital signal processor coupled to the image sensor.

18. The system of claim 15 wherein the AWB circuit determines local white balance components for each red, green, and blue value output by each pixel.

19. The system of claim 15 wherein the AWB circuit determines the local white balance component for a particular pixel using data from other pixels within a local domain surrounding the particular pixel.

20. The system of claim 15 wherein the AWB circuit determines the global white balance component for a particular pixel using image data from pixels in a global domain, the global domain being different than the local domain.

21. The system of claim 20 wherein the global domain comprises all active pixels in the pixel array.

22. The system of claim 15 wherein the spatial-domain function is a Gaussian kernel function.

23. The system of claim 15 wherein the combination of the local white balance component and the global white balance component is a linear combination.

24. A system comprising:
   an optical element;
   an image sensor coupled to the optical element, the image sensor comprising a pixel array including a plurality of pixels;

an automatic white balance (AWB) circuit coupled to the pixel array to:
  determine a local white balance component for each pixel using a spatial-domain function and an intensity-domain function, wherein the intensity-domain function decreases the weight of pixels within a local domain whose intensity differs greatly from the intensity of the pixel to which the white balance adjustment is being applied,
  determine a global white balance component for each pixel, and
  apply a white balance adjustment to each pixel, the applied white balance adjustment comprising a combination of the local white balance component and the global white balance component; and
one or both of a display unit and a storage unit coupled to the digital signal processor.

25. The system of claim 24 wherein the AWB circuit is a circuit within the image sensor.

26. The system of claim 24 wherein the AWB circuit is a digital signal processor coupled to the image sensor.

27. The system of claim 24 wherein the AWB circuit determines local white balance components for each red, green, and blue value output by each pixel.

28. The system of claim 24 wherein the AWB circuit determines the local white balance component for a particular pixel using data from other pixels within a local domain surrounding the particular pixel.

29. The system of claim 24 wherein the AWB circuit determines the global white balance component for a particular pixel using image data from pixels in a global domain, the global domain being different than the local domain.

30. The system of claim 29 wherein the global domain comprises all active pixels in the pixel array.

31. The system of claim 24 wherein the intensity-domain function is a Gaussian kernel function.

32. The system of claim 24 wherein the combination of the local white balance component and the global white balance component is a linear combination.

33. A process comprising:
  receiving image data from each pixel in a pixel array;
  determining a local white balance component for the image data from each pixel using a spatial-domain function and an intensity-domain function, wherein the spatial-domain function decreases the weight of pixels within a local domain that are spatially distant from the pixel to which the white balance adjustment is being applied;
  determining a global white balance component for the image data from each pixel; and
  applying a white balance adjustment to the image data from each pixel, the applied white balance adjustment comprising a combination of the local white balance component and the global white balance component.

34. The process of claim 33 wherein determining a local white balance component comprises determining local white balance components for each red, green, and blue value output by each pixel.

35. The process of claim 33 wherein determining a local white balance component comprises determining the local white balance component for a particular pixel using data from other pixels within a local domain surrounding the particular pixel.

36. The process of claim 33 wherein determining a global white balance component comprises using image data from pixels in a global domain, the global domain being different than the local domain.

37. The process of claim 36 wherein the global domain comprises all active pixels in the pixel array.

38. The process of claim 33 wherein the spatial-domain function is a Gaussian kernel function.

39. The process of claim 33 wherein the combination of the local white balance component and the global white balance component is a linear combination.

40. A process comprising:
  receiving image data from each pixel in a pixel array;
  determining a local white balance component for the image data from each pixel using a spatial-domain function and an intensity-domain function, wherein the intensity-domain function decreases the weight of pixels within a local domain whose intensity differs greatly from the intensity of the pixel to which the white balance adjustment is being applied;
  determining a global white balance component for the image data from each pixel; and
  applying a white balance adjustment to the image data from each pixel, the applied white balance adjustment comprising a combination of the local white balance component and the global white balance component.

41. The process of claim 40 wherein determining a local white balance component comprises determining local white balance components for each red, green, and blue value output by each pixel.

42. The process of claim 40 wherein determining a local white balance component comprises determining the local white balance component for a particular pixel using data from other pixels within a local domain surrounding the particular pixel.

43. The process of claim 40 wherein determining a global white balance component comprises using image data from pixels in a global domain, the global domain being different than the local domain.

44. The process of claim 43 wherein the global domain comprises all active pixels in the pixel array.

45. The process of claim 43 wherein the intensity-domain function is a Gaussian kernel function.

46. The process of claim 43 wherein the combination of the local white balance component and the global white balance component is a linear combination.

* * * * *